US011218683B2

(12) United States Patent
Pesonen et al.

(10) Patent No.: US 11,218,683 B2
(45) Date of Patent: Jan. 4, 2022

(54) METHOD AND AN APPARATUS AND A COMPUTER PROGRAM PRODUCT FOR ADAPTIVE STREAMING

(71) Applicant: Nokia Technologies Oy, Espoo (FI)

(72) Inventors: Mika Pesonen, Tampere (FI); Kimmo Roimela, Tampere (FI); Johannes Pystynen, Tampere (FI); Ville Timonen, Espoo (FI); Johannes Rajala, Julkujärvi (FI); Emre Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/495,288

(22) PCT Filed: Mar. 20, 2018

(86) PCT No.: PCT/FI2018/050209
§ 371 (c)(1),
(2) Date: Sep. 18, 2019

(87) PCT Pub. No.: WO2018/172614
PCT Pub. Date: Sep. 27, 2018

(65) Prior Publication Data
US 2020/0036955 A1    Jan. 30, 2020

(30) Foreign Application Priority Data
Mar. 22, 2017   (FI) ..................................... 20175260

(51) Int. Cl.
*H04N 13/161*    (2018.01)
*H04L 29/06*    (2006.01)
(Continued)

(52) U.S. Cl.
CPC ........... *H04N 13/161* (2018.05); *H04L 65/80* (2013.01); *H04N 13/111* (2018.05); *H04N 13/15* (2018.05);
(Continued)

(58) Field of Classification Search
CPC .... H04N 13/161; H04N 13/15; H04N 13/111; H04N 13/282; H04N 13/10;
(Continued)

(56) References Cited

U.S. PATENT DOCUMENTS 7,257,237 B1 *  8/2007  Luck ..................... A61B 5/1113
                                                    382/103
8,717,405 B2    5/2014  Li et al.
(Continued)

FOREIGN PATENT DOCUMENTS

EP          3065406 A1     9/2016
WO    WO-2015/155406 A1   10/2015
(Continued)

OTHER PUBLICATIONS

"Advanced Video Coding for Generic Audiovisual Services", Series H: Audiovisual and Multimedia Systems Infrastructure of audiovisual services—Coding of moving video, ITU-T H.264, Oct. 2016, 804 pages.
(Continued)

*Primary Examiner* — Alexander Gee
(74) *Attorney, Agent, or Firm* — Harrington & Smith (57) ABSTRACT

The invention relates to a method and technical equipment for implementing the method. The method comprises generating a three-dimensional segment of a scene of a content; generating more than one two-dimensional views of the three-dimensional segment, each two-dimensional view representing a virtual camera view; generating multi-view streams by encoding each of the two-dimensional views;
(Continued)

encoding parameters of a virtual camera to the respective stream of the multi-view stream; receiving a selection of one or more streams of the multi-view stream; and streaming only the selected one or more streams.

19 Claims, 7 Drawing Sheets

(51) Int. Cl.
*H04N 13/15* (2018.01)
*H04N 13/282* (2018.01)
*H04N 13/111* (2018.01)
*H04N 19/597* (2014.01)
*H04N 13/00* (2018.01)
*H04N 13/279* (2018.01)
*H04N 13/194* (2018.01)

(52) U.S. Cl.
CPC ......... *H04N 13/282* (2018.05); *H04N 19/597* (2014.11); *H04N 2013/0081* (2013.01)

(58) Field of Classification Search
CPC .. H04N 13/106; H04N 13/117; H04N 13/279; H04N 19/597; H04N 2013/0081; H04L 65/80
See application file for complete search history.

(56) References Cited

U.S. PATENT DOCUMENTS

| | | | |
|---|---|---|---|
| 8,917,270 | B2 | 12/2014 | Sweeney et al. |
| 2002/0158873 | A1 | 10/2002 | Williamson |
| 2014/0063024 | A1* | 3/2014 | Zhang .................. G06T 9/007 345/506 |
| 2014/0285640 | A1* | 9/2014 | Yoon .................... H04N 13/15 348/54 |
| 2015/0109410 | A1* | 4/2015 | Bonefas ................. H04N 7/18 348/43 |
| 2015/0117547 | A1 | 4/2015 | Zhao et al. |
| 2015/0172544 | A1 | 6/2015 | Deng et al. |
| 2015/0249813 | A1* | 9/2015 | Cole ............... H04N 21/21805 386/241 |
| 2016/0014395 | A1* | 1/2016 | Murray ................. G06T 7/251 348/42 |
| 2016/0110647 | A1* | 4/2016 | Krueger ................ G06Q 50/01 706/11 |
| 2016/0300392 | A1* | 10/2016 | Jonczyk ................ G06T 7/536 |
| 2017/0227765 | A1* | 8/2017 | Mammou .............. H04L 65/60 |
| 2018/0091791 | A1* | 3/2018 | Jiang .................... E04H 4/1618 |
| 2018/0262741 | A1* | 9/2018 | Fu ....................... H04N 13/324 |

FOREIGN PATENT DOCUMENTS

| | | |
|---|---|---|
| WO | 2016/167814 A1 | 10/2016 |
| WO | 2016/181202 A1 | 11/2016 |

OTHER PUBLICATIONS

"PresenZ 2.0", Presenzvr, Retrieved on Aug. 5, 2019, Webpage available at : https://www.presenzvr.com/.
"360° 6D Of Volumetric Video", HypeVR, Retrieved on Aug. 5, 2019, Webpage available at : https://hypevr.com/about/.
Finland Application No. 20175170, "A Method and An Apparatus and a Computer Program Product for Video Processing", filed on Feb. 24, 2017, 27 pages.
Ni et al., "RGBD-HuDaAct: A Color-Depth Video Database for Human Daily Activity Recognition", IEEE International Conference on Computer Vision Workshops, 2011, pp. 1147-1153.
Office action received for corresponding Finland Patent Application No. 20175260, dated Sep. 26, 2017, 9 pages.
Zhang et al., "Depth Based Region Of Interest Extraction For Multi-View Video Coding", Proceedings of the Eighth International Conference on Machine Learning and Cybernetics, Jul. 12-15, 2009, pp. 2221-2227.
Sun et al., "An Overview of Free Viewpoint Depth-Image-Based Rendering (DIBR)", Proceedings of the Second APSIPA Annual Summit and Conference, Dec. 14-17, 2010, pp. 1023-1030.
International Search Report and Written Opinion received for corresponding Patent Cooperation Treaty Application No. PCT/FI2018/050209, dated Jul. 18, 2018, 15 pages.
Maugey et al., "Navigation Domain Representation For Interactive Multiview Imaging", IEEE Transactions On Image Processing, vol. 22, No. 9, Sep. 2013, pp. 3459-3472.
P. Lacroute; "Analysis of a Parallel Volume Rendering System Based on the Shear-Warp Factorization"; IEEE Transactions on Visualization and Computer Graphics, vol. 2, No. 3; Sep. 1, 1996; pp. 218-231.

* cited by examiner

METHOD AND AN APPARATUS AND A COMPUTER PROGRAM PRODUCT FOR ADAPTIVE STREAMING

CROSS-REFERENCE TO RELATED APPLICATION

This application was originally filed as Patent Cooperation Treaty Application No. PCT/FI2018/050209 filed Mar. 20, 2018, and further claims priority benefit to FI Patent Application No. 20175260, filed Mar. 22, 2017.

BACKGROUND

Since the beginning of photography and cinematography, the most common type of image and video content has been captured and displayed as a two-dimensional (2D) rectangular scene.

More recently, new image and video capture devices are available. These devices are able to capture visual and audio content all around themselves, i.e. they can capture the whole angular field of view, sometimes referred to as 360 degrees field of view. More precisely, they can capture a spherical field of view (i.e., 360 degrees in all axes). Furthermore, new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

Now there has been invented an improved method and technical equipment implementing the method, for encoding virtual reality scenes as multiple virtual camera views, which can then be selectively and adaptively streamed to the viewer. Various aspects of the invention include a method, an apparatus and a computer readable medium comprising a computer program stored therein, which are characterized by what is stated in the independent claims. Various embodiments of the invention are disclosed in the dependent claims.

According to a first aspect, there is provided a method, comprising: generating a three-dimensional segment of a scene of a content; generating more than one two-dimensional views of the three-dimensional segment, each two-dimensional view representing a virtual camera view; generating multi-view streams by encoding each of the two-dimensional views; encoding parameters of a virtual camera to the respective stream of the multi-view stream; receiving a selection of one or more streams of the multi-view stream; and streaming only the selected one or more streams.

According to a second aspect, there is provided an apparatus comprising at least one processor, memory including computer program code, the memory and the computer program code configured to, with the at least one processor, cause the apparatus to perform at least the following: to generate a three-dimensional segment of a scene of a content; to generate more than one two-dimensional views of the three-dimensional segment, each two-dimensional view representing a virtual camera view; to generate multi-view streams by encoding each of the two-dimensional views; to encode parameters of a virtual camera to the respective stream of the multi-view stream; to receive a selection of one or more streams of the multi-view stream; and to stream only the selected one or more streams.

According to a third aspect, there is provided a computer program product embodied on a non-transitory computer readable medium, comprising computer program code configured to, when executed on at least one processor, cause an apparatus or a system to generate a three-dimensional segment of a scene of a content; generate more than one two-dimensional views of the three-dimensional segment, each two-dimensional view representing a virtual camera view; generate multi-view streams by encoding each of the two-dimensional views; encode parameters of a virtual camera to the respective stream of the multi-view stream; receive a selection of one or more streams of the multi-view stream; and stream only the selected one or more streams.

According to an embodiment, the two-dimensional view is a color and depth view.

According to an embodiment, the two-dimensional view comprises material and surface property channels.

According to an embodiment, the selection is based on the parameters of the virtual camera.

According to an embodiment, parameters comprises one or more of the following: a pose, a resolution, a projection type, a field of view, and depth range.

According to an embodiment, the content is captured by multiple cameras.

According to an embodiment, the content is synthetic content.

DESCRIPTION OF THE DRAWINGS

In the following, various embodiments of the invention will be described in more detail with reference to the appended drawings, in which.

DESCRIPTION OF EXAMPLE EMBODIMENTS

The present embodiments relate to virtual reality (VR). In particular, the present embodiments relate to streaming of three-dimensional (3D) virtual reality video for six degrees of freedom (6 DoF) viewing.

Volumetric video may be captured using one or more cameras. Volumetric video is to virtual reality what traditional video is to 2D/3D displays. When multiple cameras are in use, the captured footage is synchronized so that the cameras provide different viewpoints to the same world. In contrast to traditional 2D/3D video, volumetric video describes a 3D model of the world where the viewer is free to move and observe different parts of the world.

The present embodiments are discussed in relation to media content captured with more than one camera devices.

Figure 1:
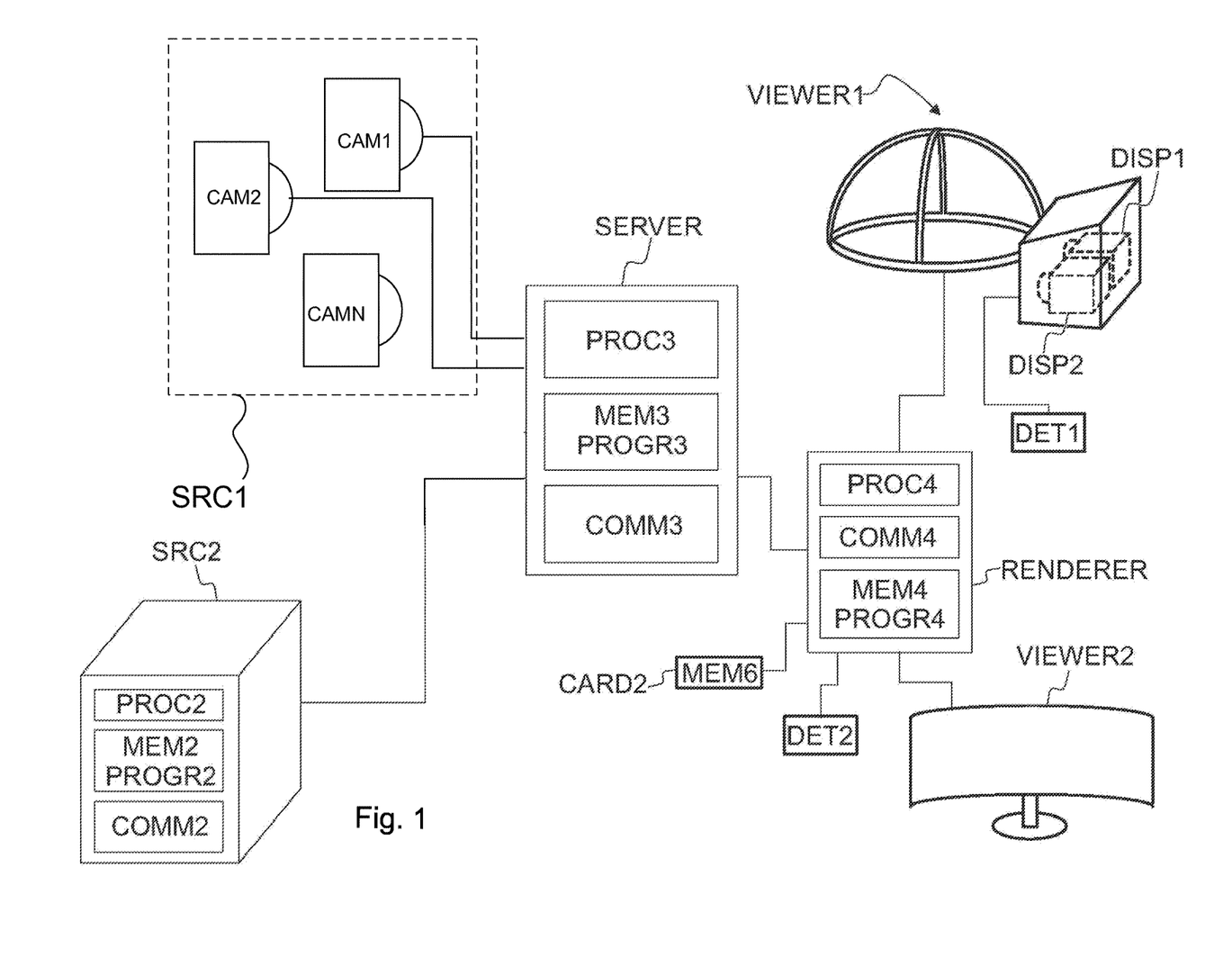
FIG. 1 shows a system according to an embodiment.

FIG. 1 shows a system and apparatuses for stereo viewing, that is, for 3D video and 3D audio digital capture and playback. The task of the system is that of capturing sufficient visual and auditory information from a specific location such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 comprises multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high resolution orientation sensor so that the orientation (direction of view) of the plurality of cameras CAM1, CAM2, . . . , CAMN can be detected and recorded. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively or in addition to the source device SRC1 creating an image stream, or a plurality of such, one or more sources SRC2 of synthetic images may be present in the system. Such sources of synthetic images may use a computer model of a virtual world to compute the various image streams it transmits. For example, the source SRC2 may compute N video streams corresponding to N virtual cameras located at a virtual viewing position. When such a synthetic set of video streams is used for viewing, the viewer may see a three-dimensional virtual world. The device SRC2 comprises or is functionally connected to a computer processor PROC2 and memory MEM2, the memory comprising computer program PROGR2 code for controlling the synthetic sources device SRC2. The image stream captured by the device may be stored on a memory device MEM5 for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or computation device SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream from a server and for decoding the video data stream. The data stream may be received over a network connection through communications interface COMM4, or from a memory device MEM6 like a memory card CARD2. The viewer devices may have a graphics processing unit for processing of the data to a suitable format for viewing. The viewer VIEWER1 comprises a high-resolution stereo-image head-mounted display for viewing the rendered stereo video sequence. The head-mounted display may have an orientation sensor DET1 and stereo audio headphones. According to an embodiment, the viewer VIEWER2 comprises a display enabled with 3D technology (for displaying stereo video), and the rendering device may have a head-orientation detector DET2 connected to it. Alternatively, the viewer VIEWER2 may comprise a 2D display, since the volumetric video rendering can be done in 2D by rendering the viewpoint from a single eye instead of a stereo eye pair. Any of the devices (SRC1, SRC2, SERVER, RENDERER, VIEWER1, VIEWER2) may be a computer or a portable computing device, or be connected to such. Such rendering devices may have computer program code for carrying out methods according to various examples described in this text.

Figure 2A:
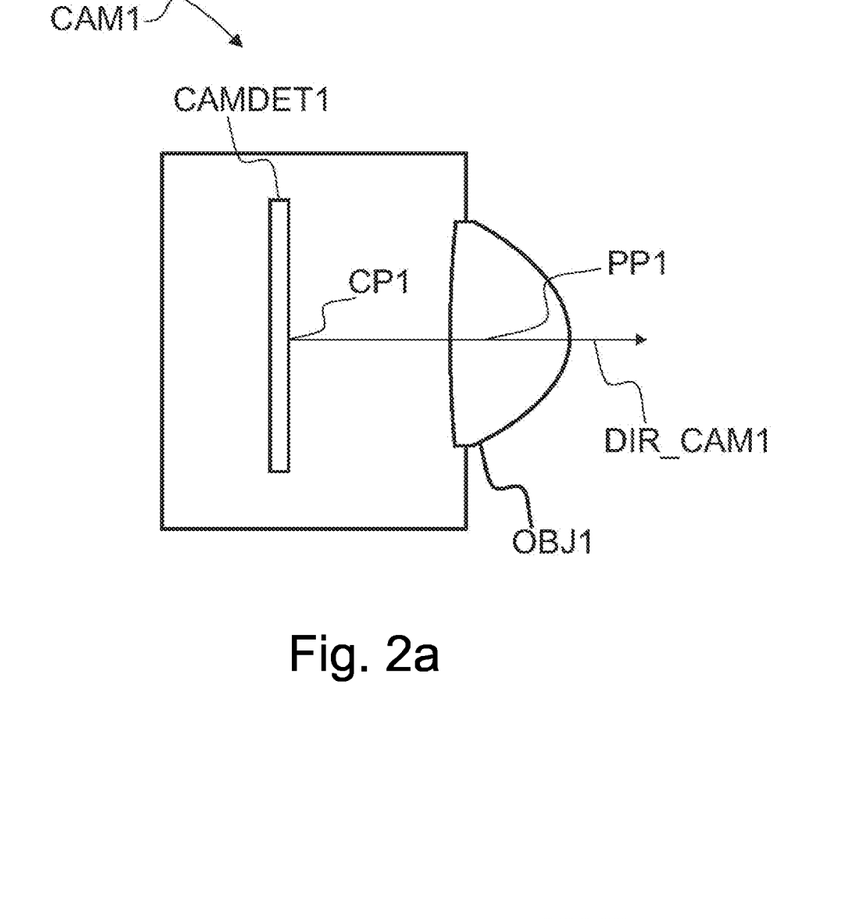
FIG. 2a shows a camera device according to an embodiment.

FIG. 2a illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

Figure 2B:
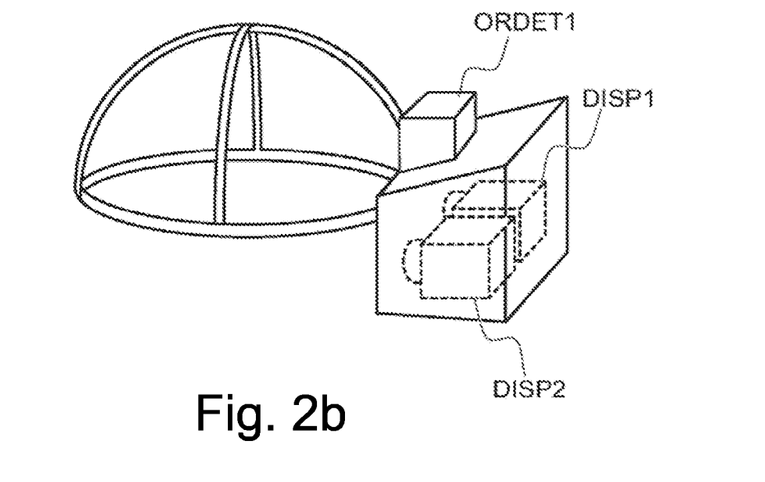
FIG. 2b shows a display device according to an embodiment.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video, audio and orientation data is first recorded with the capture device. This can consist of multiple concurrent video and audio streams as described above. These are then transmitted immediately or later to the storage and processing network for processing and conversion into a format suitable for subsequent delivery to playback devices. The conversion can involve post-processing steps to the audio and video data in order to improve the quality and/or reduce the quantity of the data while preserving the quality at a desired level. Finally, each playback device receives a stream of the data from the network, and renders it into a stereo viewing reproduction of the original location which can be experienced by a user with the head-mounted display and headphones.

Figure 3:
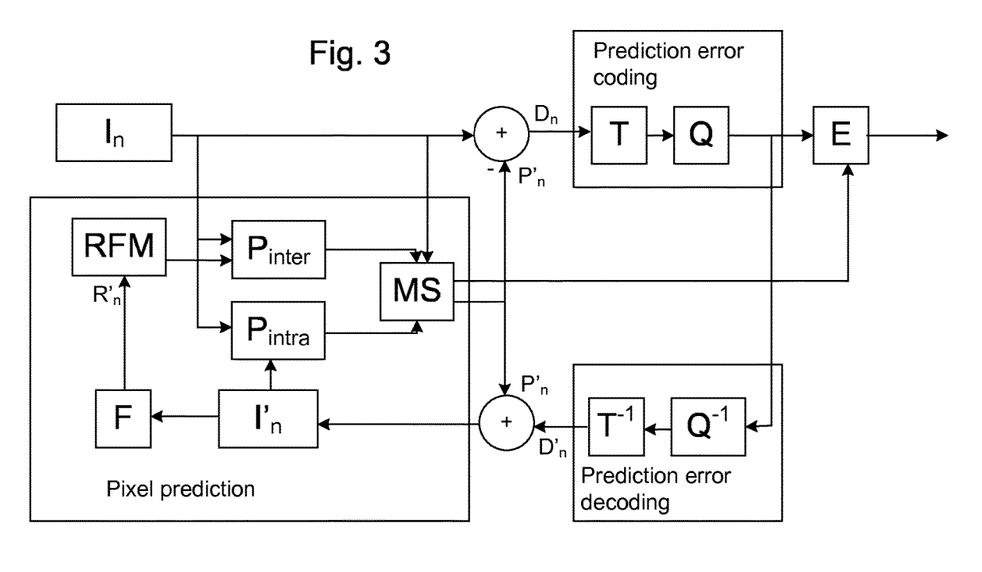
FIG. 3 shows an encoding process according to an embodiment.
Figure 4:
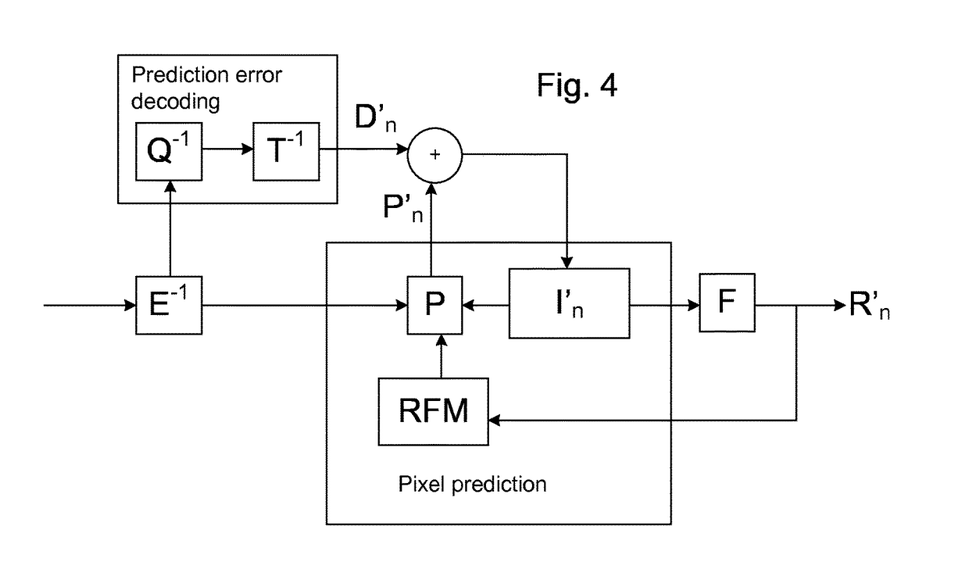
FIG. 4 shows a decoding process according to an embodiment.

A video codec consists of an encoder that transforms an input video into a compressed representation suited for storage/transmission and a decoder that can uncompress the compressed video representation back into a viewable form. Typically encoder discards some information in the original video sequence in order to represent the video in a more compact form (that is, at lower bitrate). An example of an encoding process is illustrated in FIG. 3. FIG. 3 illustrates an image to be encoded ($I''$); a predicted representation of an image block ($P'''$); a prediction error signal ($D''$); a reconstructed prediction error signal ($D'''$); a preliminary reconstructed image ($I'''$); a final reconstructed image ($R'''$); a transform (T) and inverse transform ($T^{-1}$); a quantization (Q) and inverse quantization ($Q^{-1}$); entropy encoding (E); a reference frame memory (RFM); inter prediction (Pinter); intra prediction ($P^{intra}$); mode selection (MS) and filtering (F). An example of a decoding process is illustrated in FIG. 4. FIG. 4 illustrates a predicted representation of an image block ($P'''$); a reconstructed prediction error signal ($D'''$); a preliminary reconstructed image ($I'''$); a final reconstructed image ($R'''$); an inverse transform ($T^{-1}$); an inverse quantization ($Q^{-1}$); an entropy decoding ($E^{-1}$); a reference frame memory (RFM); a prediction (either inter or intra) (P); and filtering (F).

As mentioned, the present embodiment relate to adaptive streaming of 3D virtual reality video for six degrees of freedom (6 DoF) viewing. Since the data rates of full-resolution VR scenes are high, efficient compression and decompression of the content is expected. Even though current video hardware may have built-in support for accelerated decoding of 2D video (such as H.264), the 6 DoF nature of real volumetric VR content precludes trivial encoding of the content as a single 2D video. Moreover, adaptive streaming is desirable because it may enable avoiding sending of data that does not contribute to the user's current view of the content.

Voxel or mesh based approaches can be readily applied to animated 3D content and enable adaptive streaming, but there is no codec that can readily support hardware-accelerated decoding of such content in current hardware. This may create a bottleneck in the delivery chain of the content thus destroying the whole immersive experience. There is a need for an optimized representations, which are hardware video decoder friendly and which can be efficiently pipe-lined to the hardware decoders with sufficient amount of data corresponding to the current viewer's field of view.

Therefore in the present embodiments, virtual reality scenes are encoded as multiple virtual camera views that can be selectively and adaptively streamed to the viewer. According to an embodiment, the solution comprises generating a sufficient number of two-dimensional (e.g. color and depth views) that are optimized for the scene content and for the desired viewing region. These views can be statically generated and compressed using existing video codecs. Based on scene metadata, the viewing client may then select the streams necessary for the current codecs. The selected views are streamed, and efficiently decoded in the current hardware decoders, and composited to generate a real-time 3D volumetric view of the scene from the viewer's current position in an optimal way.

The embodiments are discussed in more detailed manner in the following.

Figure 5:
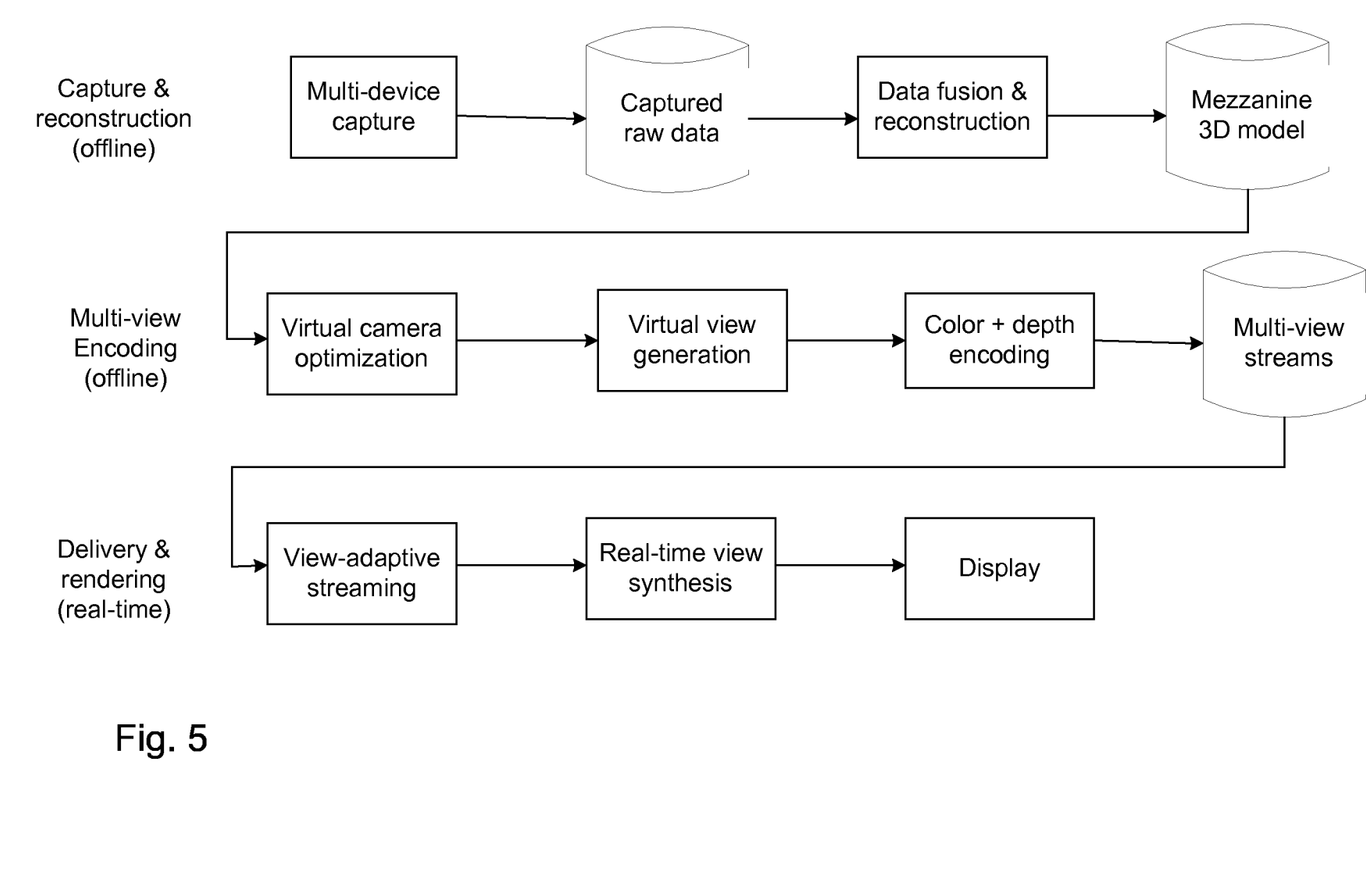
FIG. 5 shows an overview of a volumetric 6 DoF content consumption.

FIG. 5 shows an overview of a pipeline for generating and viewing 6 DoF VR content according to embodiments. It is to be noticed that the actual camera based capture and scene reconstruction stages are assumed to be outside of the scope of the invention, however we describe an example embodiment of an offline capture system in the following. The multi-device capture system is configured to capture raw visual data of a dynamic scene by using multiple cameras and alternatively also by additional depth sensors. Alternatively, the scene may be synthetic, which means that it is synthetically generated without actual cameras capturing the scene. When cameras are used, thee cameras and other sensors are operated simultaneously so that each device will record its own view of the dynamic scene, resulting in captured raw data for each individual camera and sensor.

At first the raw per-device data may be first synchronized in time. This can be done by having the clocks in each device synchronized before capturing, for example by using a protocol such as PTP (Precision Time Protocol) in a local network that the devices are connected to, or other form of timecode transmitted in the local network. If clock synchronization was not done before capturing, recorded audio signals can be used for synchronizing the cameras. An explicit visual synchronization event, of which a clapperboard is a traditional example, can be utilized to aid in manual synchronization of devices that do not record audio, such as LiDAR (Light Detecting and Ranging) depth sensors.

After time-synchronization, the captured raw data are registered in 3D. For cameras, the 2D visual features in the camera images can be identified and the camera poses recovered through established structure-from-motion techniques. For each camera having a plurality of imaging elements, a dense depth map can additionally be estimated using stereo imaging techniques. These techniques together enable a dense 3D point cloud to be reconstructed from the plurality cameras used to capture the scene.

Non-camera devices can initially be registered manually, and the manual registration refined by matching e.g. LiDAR point cloud data to the 3D data reconstructed from the multi-view cameras. A sufficiently high-resolution visual reconstruction enables the LiDAR data to be registered using point-cloud alignment techniques such as iterative closest point. Once the LiDAR data is registered, it is used to iteratively refine the 3D point cloud reconstructed from the multi-view cameras alone, to arrive at a more high-quality 3D reconstruction.

Having reconstructed the time-synchronized and 3D-registered raw data into sufficiently high detail, the resulting 3D geometry and the image colors coming from the cameras are finally and fused into a high quality mezzanine 3D volumetric model containing all of the details captured from the scene. This mezzanine model can be in a number of formats, for example, an animated voxel model of the scene, or a collection of input camera views with corresponding high-resolution depth maps.

In one embodiment, the mezzanine model is a Sparse Voxel Octree (SVO). An SVO is a tree of volume elements where the root node covers the extent of the entire captured scene, and each successive level branches into eight subtrees that describe a sub-volume of the scene in higher detail. The term 'sparse' refers to the fact that empty subtree are omitted from the structure. Thus, the SVO is a multi-resolution representation of the reconstructed scene geometry. Each voxel in the SVO additionally contains color and possibly other shading information such as a surface normal and reflectance properties.

In an embodiment, an animated voxel model encodes successive frames of a volumetric video as a combination of a full base frame and change-sets containing the changed parts of the SVO for each successive frame.

In another embodiment, the 3D model is an animated 3D scene created in a 3D modeling program, omitting the capture and reconstruction stages described previously. From this animated scene, a similar mezzanine representation can be created, and the rest of the encoding and streaming pipeline is agnostic to the source of the 3D model.

In an embodiment, the mezzanine 3D model consists of one or more 360° panorama images with associated depth maps and 3D camera pose information.

After the mezzanine model has been reconstructed or acquired, multiple virtual views are created to represent the essence of the 3D scene as a plurality of 2D videos. In an embodiment, these virtual view videos are stored as static files with associated scene metadata in a content delivery network. From there, a viewer can, based on the scene metadata, dynamically subscribe to a plurality of the 2D videos that best represent the scene from the current viewpoint of the viewer.

According to an embodiment, more than one virtual cameras can be defined for capturing a 2D view of a 3D segment of the scene. Full 3D scene can be presented with multiple virtual cameras. A 2D view of a 3D segment may be a color and depth view of a respective virtual camera. In addition, the two-dimensional view may comprise material and surface property channels. Examples of such channels comprises one or more of the following: surface normal vectors, material roughness, material glossiness, etc.

Two-dimensional views may allow good compression rates and lower bandwidth delivery to viewer devices (i.e. player devices). Typically, viewer devices only have accelerated video hardware and GPUs (Graphical Processing Unit) and therefore this color and depth presentation format suits well for the target devices and hence wide variety of devices will be supported.

Virtual cameras should be placed on the scene so that they maximize the scene coverage and minimize occluded regions. However, covering the full scene may lead to a high number of virtual cameras. Moreover, the number of the virtual cameras should be minimized so that most of them see unique and not overlapping areas of the scene. Such an approach optimizes the amount of data to be delivered to the client if this data is to be streamed. Hence, the content visible from multiple virtual cameras may be optimized for the sake of reducing per-stream overhead and redundancy.

In one embodiment, virtual camera optimization is based on the octree structure inherent to an SVO mezzanine representation. The octree splits the scene into sub-volumes, where each sub-volume contains the geometry for a part of the scene. For each sub-volume, an oriented bounding box is computed for the geometry, and an orthogonal virtual camera is created that views the content of that oriented bounding box. This process is terminated at a specific level in the octree, so that virtual cameras are not created for sub-volumes smaller than a specified threshold.

In another embodiment, the virtual cameras are defined by a user in a 3D content editor so that they track specific regions of interest (ROI) in the scene.

In another embodiment, regions of interest are automatically detected based on face detection, and virtual cameras are created to capture the faces in higher detail than the rest of the scene.

In an embodiment, a subset of the virtual views are created by tiling the captured input camera views.

In an embodiment, the virtual views are created by tiling a 360° panorama image into M×N virtual views, each covering a region of 360/M by 180/N degrees.

Figure 6:
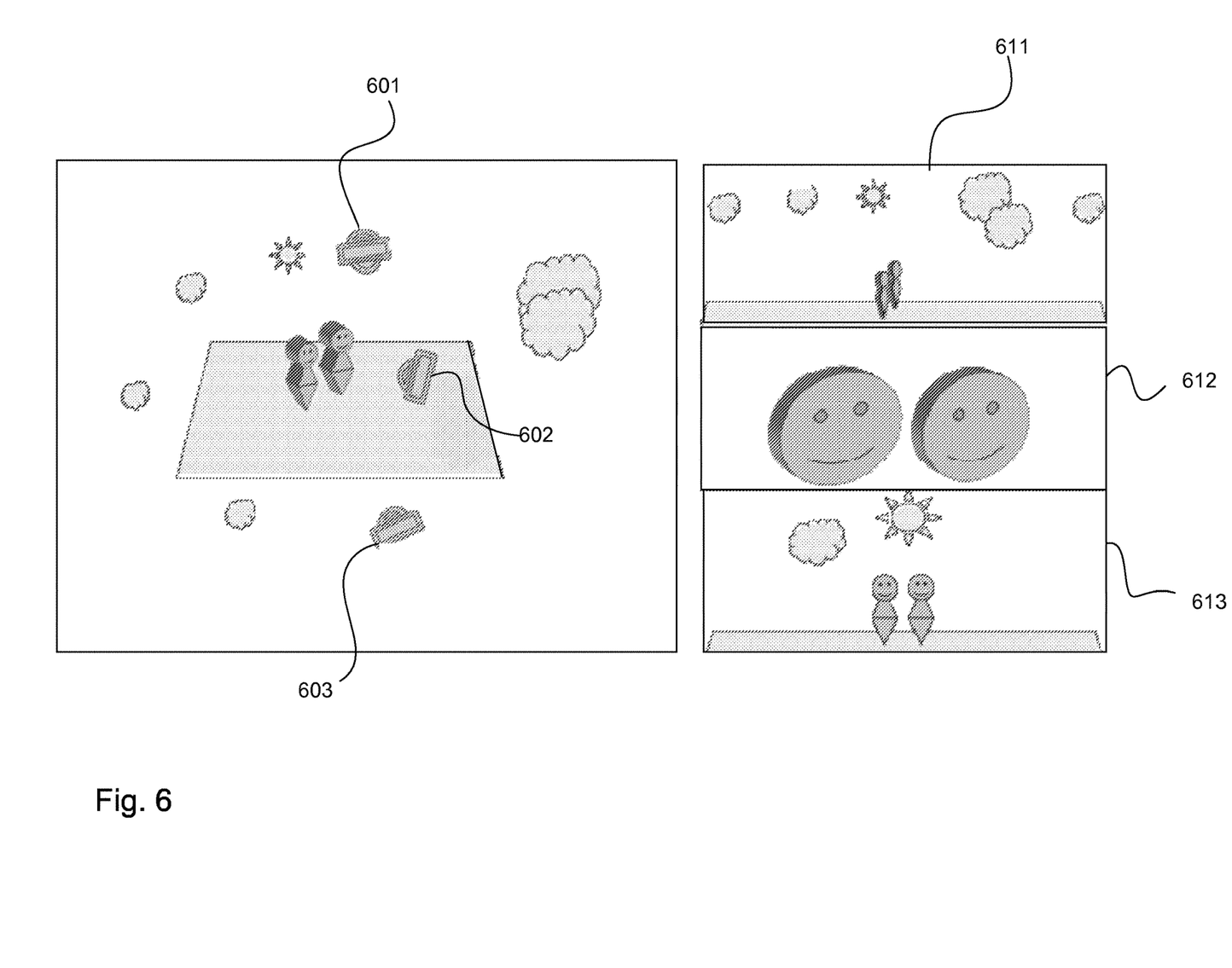
FIG. 6 shows an example of three different cameras on a scene.

FIG. 6 illustrates an example of having different cameras in the scene: panorama 360-camera 601 for background (circular depth range) and normal perspective cameras 602, 603 for central content. The perspective cameras comprises a portrait close-up camera 602 and a portrait camera 603. Each of the cameras 601, 602, 603 captures respective content 611, 612, 613.

In addition to defining ideal virtual camera locations per frame, the motion of virtual cameras is constrained between frames so that abrupt changes in the video content are avoided and the video compression can utilize motion encoding inside each virtual view.

According to an embodiment, having derived the ideal per-frame virtual camera layout, this layout is smoothed by fitting a curve through the ideal 3D locations of each virtual camera, resampling the per-frame camera positions from that curve, and adjusting camera orientation so that the ROI targeted by that camera remains inside the virtual view.

As depth images are encoded to video frames, depth range for the virtual cameras needs to be minimized. Most video decoders only support 8-bit grayscale and depth range should be encoded to this. If a large depth range is used, it means that 3D objects can be presented only with coarse resolution. Therefore it's important to optimize the depth range for each virtual camera. As depth values have min/max range, in most cases max value is treated as infinity in the rendering. Therefore max−1 (−1 or some other threshold value) value should be used as depth range when encoding the virtual camera depth values.

Once optimal locations are determined for virtual cameras, two-dimensional content has to be streamed to the viewing client. Virtual cameras can be streamed individually to the viewers which can support high number of simultaneous video decoding streams. For the media viewer devices only supporting a few video decoder instances, multiple virtual cameras should be encoded onto a single view (e.g. a texture atlas). As an example, 16 virtual cameras can be presented by 4×4 grid, where each grid element has the same size. It is expected that the texture atlases are very high resolution (e.g. 4K-8K) atlases. Thus, color and depth should have their own atlases.

Each virtual camera can be represented with the following parameters: pose (i.e. position and orientation), resolution, projection type (e.g. pinhole, orthographic, equirectangular, stereographic, etc.), field of view (e.g. specific sub-rectangle of an equirectangular panorama), depth range (min, max) and encoding (bit depth and quantization; linear, logarithmic or other). The parameters of the virtual cameras can be encoded as per frame metadata to the video stream. Metadata may include virtual camera parameters and also the location and size (x, y, w, h in pixels) in the texture atlas, where the virtual camera is located. Typically virtual cameras have different sizes inside the texture atlas. In some cases color and layout may not be exactly the same for some of the virtual cameras, e.g. depth may be encoded in a lower resolution.

Per-frame metadata allows dynamic changes to texture atlas layout and also to the number of virtual cameras. It is understood that any major layout change should happen only in the video I-frames where full encoding is done for the color and depth texture atlases.

Figure 7:
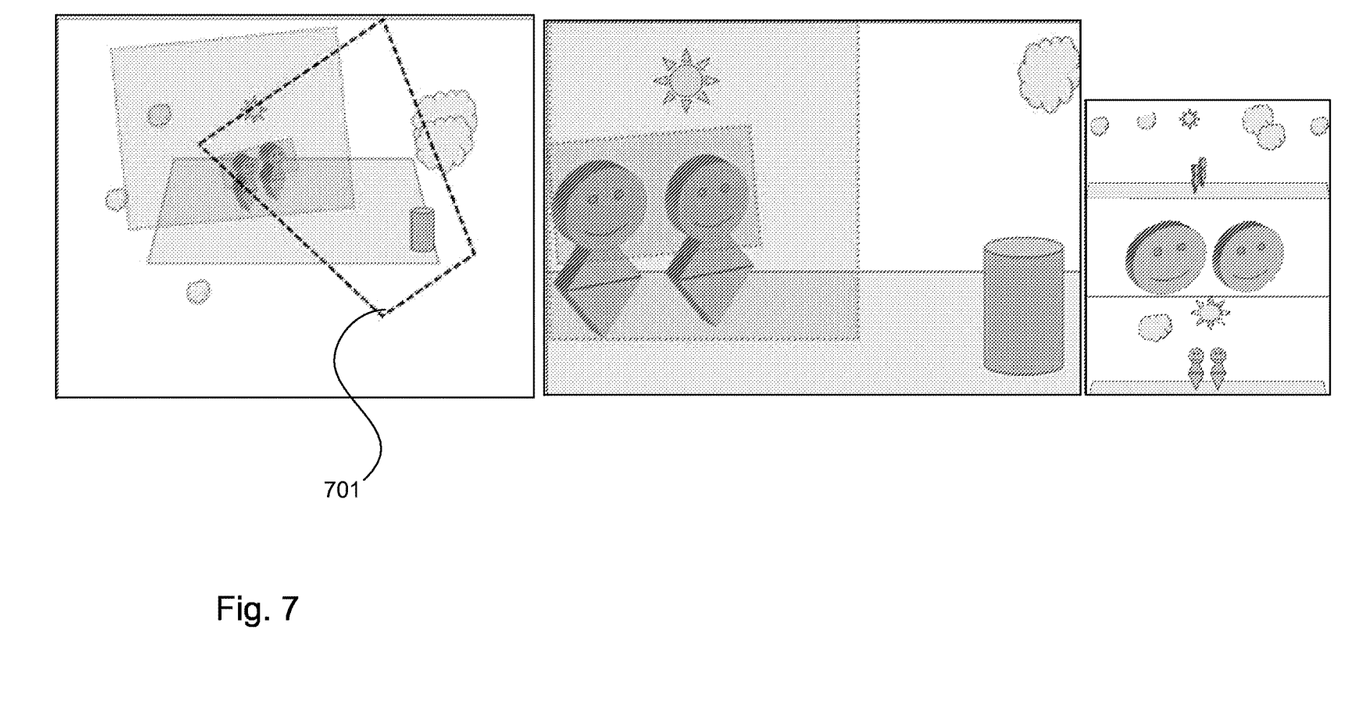
FIG. 7 shows an example of selecting virtual camera views for streaming.

Content viewer is able to know where the user is located and what is its viewing direction. Based on these parameters, virtual cameras may be selected to be streamed from the server. Selection of which virtual cameras are to be streamed may be based on the virtual camera proximity to the user location. Nearest virtual cameras can be streamed with higher resolution than the virtual cameras that are far away. User viewing direction and the HMD field-of-view (FOV) parameters allow to determine if the 3D segment that virtual camera represents is inside the viewing volume, as illustrated in FIG. 7 with reference 701. FIG. 7 illustrates a selection of virtual camera views for streaming. The viewer's view frustum defines the visible scene segment 701. This is tested to overlap with the pre-encoded 3D scene segments, and the overlapping segments are selected for streaming. If the virtual camera 3D segment is visible from the user location, it should be streamed. However, as the user can rotate his/her head quickly, also the opposite viewing direction has to be streamed. This can be done in lower resolution.

Matching available scene segments to the current view frustum is done based on the per-frame metadata described earlier. In particular, the camera projection parameters and depth range together define a 3D bounding volume for each of the scene segments, which can be matched against the view frustum.

In practice, there may be more scene segments overlapping with the view frustum than are allowed by the streaming bandwidth and/or hardware limitations of the target platform. In such case, a more fine-grained prioritization between the available scene segments is done based on the percentage that each scene segment covers from the current view, and the difference in viewing angle between the encoded virtual camera location of each segment and the current viewing camera. Based on the prioritization, the highest-priority segments can then be selected for streaming in high resolution.

Video streaming cannot react to HMD movement in milliseconds, therefore there is always extra data streamed in the video streams. Hence, every frame, as a pre-process for rendering, streamed virtual views may be analyzed and parts of the stream images of the whole stream images can be culled before the actual rendering.

Per frame, color and depth stream images from virtual views are projected into user's view. The images can be projected as textured 3D patches or point clouds. This can occur as a single-pass textured patches, or depth pre-pass followed by screen-space texturing.

Packed video frames may not have enough resolution to match every single pixel in HMD view in every frame. Therefore, temporal filtering with history frames can be used to stabilize and fill in the missing pixels before presenting the final image to the user.

In previous, a method for adaptive streaming has been disclosed. The method comprises capturing raw visual data of a dynamic scene or using synthetic content as a source for the scene. The captured raw data may be registered in three dimension (3D) and fused into a high-quality mezzanine 3D volumetric model containing all of the details captured from the scene. Virtual cameras are defined to capture a two-dimensional (2D) view of a 3D segment of the scene. The segment is presented by color plus depth images from virtual camera's point of view. The two-dimensional view may also comprise material and surface property channels. Depth range for each virtual camera may be optimized. Multi-view streams may be generated by color and depth encoding. The parameters of virtual cameras may be encoded as per frame metadata to the stream. Further, to ensure optimal content streaming, virtual cameras that are in a proximity to the user location are selected for streaming. The viewer's view frustum can be tested for overlap with the pre-encoded 3D scene segments and finally the overlapping segments may be selected for streaming.

Figure 8:
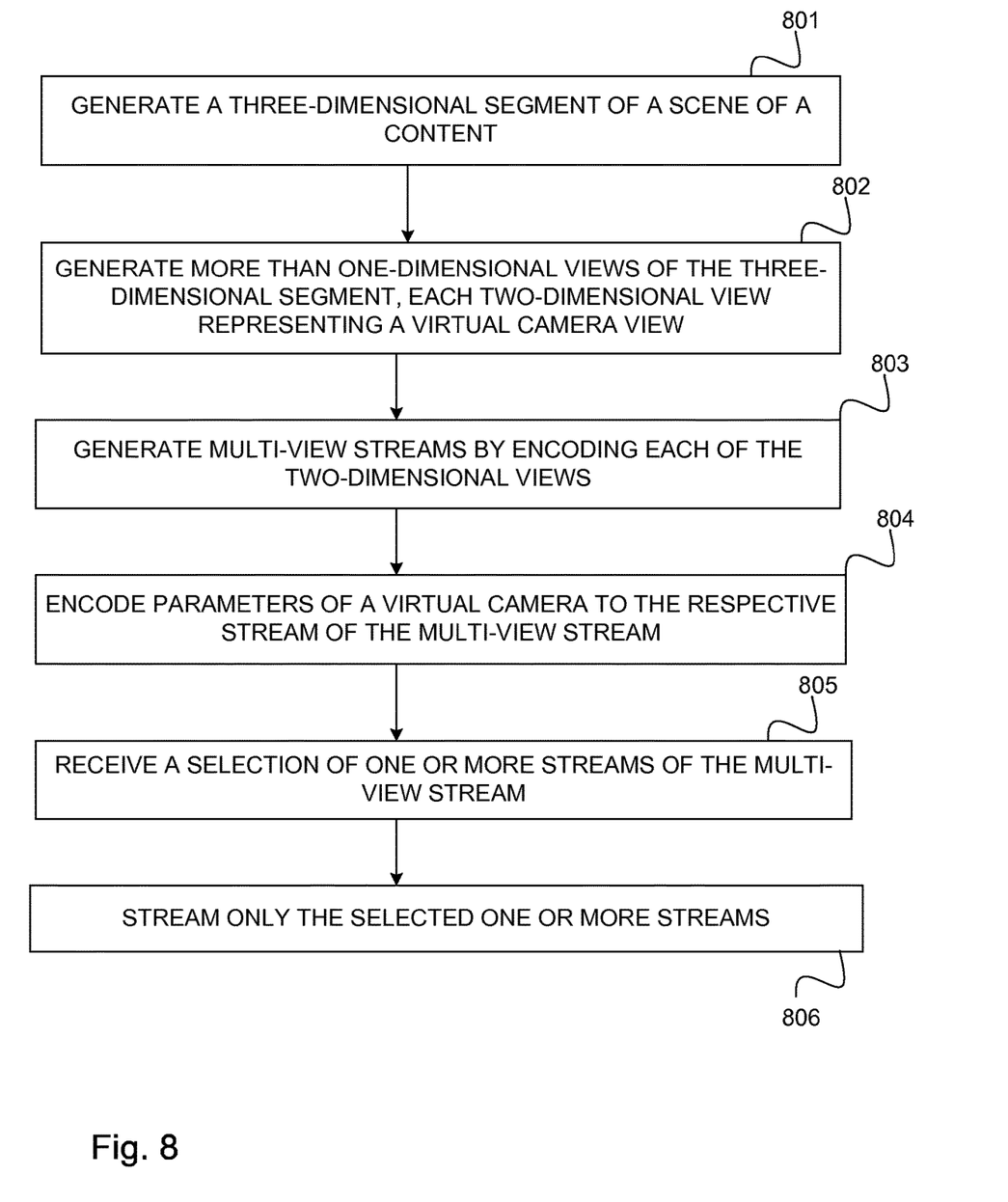
FIG. 8 is a flowchart of a method according to an embodiment.

FIG. 8 is a flowchart of a method according to an embodiment. The method, according to an embodiment, comprises generating a three-dimensional segment of a scene of a content 801; generating more than one two-dimensional views of the three-dimensional segment, each two-dimensional view representing a virtual camera view 802; generating multi-view streams by encoding each of the two-dimensional views 803; encoding parameters of a virtual camera to the respective stream of the multi-view stream 804; receiving a selection of one or more streams of the multi-view stream 805; and streaming only the selected one or more streams 806.

An apparatus according to an embodiment comprises means for implementing the method. These means may comprise a computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

The various embodiments may provide advantages. In addition to the advantages being disclosed in previous, the solution is also compatible with existing graphics and video hardware. Further, the present embodiments enable selective streaming of large 6 DoF scenes.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
generating a three-dimensional segment of a scene of a content, wherein the three-dimensional segment is a three-dimensional volumetric representation of the scene;
generating a plurality of two-dimensional views of the three-dimensional segment, wherein a two-dimensional view of the plurality of two-dimensional views is configured to represent a respective virtual camera view, wherein the two-dimensional view comprises, at least, material and surface property channels;
generating multi-view streams, wherein the generating of the multi-view streams comprises encoding the plurality of two-dimensional views;
encoding parameters of the respective virtual camera view to a respective stream of the multi-view streams, wherein said parameters comprise one or more of the following: a pose, a resolution, a projection type, a field of view, or a depth range;
receiving a selection of one or more streams of the multi-view streams; and
streaming the selected one or more streams.

2. The method according to claim 1, wherein the plurality of two-dimensional views comprises, at least, a color view and a depth view, wherein the depth view is generated as a separate view from the color view.

3. The method according to claim 1, wherein the selection is based on the parameters of the respective virtual camera view.

4. The method according to claim 1, wherein the parameters are configured to indicate a relationship between the respective virtual camera view and the three-dimensional segment, wherein the two-dimensional view of the plurality of two-dimensional views is generated based on the parameters of the respective virtual camera view encoded to the respective stream of the multi-view streams.

5. The method according to claim 1, wherein the content is captured with multiple cameras.

6. The method according to claim 1, wherein the content is a synthetic content.

7. An apparatus comprising at least one processor, at least one non-transitory memory including computer program code, the at least one memory and the computer program code configured to, with the at least one processor, cause the apparatus to perform at least the following:
generate a three-dimensional segment of a scene of a content, wherein the three-dimensional segment is a three-dimensional volumetric representation of the scene;
generate a plurality of two-dimensional views of the three-dimensional segment, wherein a two-dimensional view of the plurality of two-dimensional views is configured to represent a respective virtual camera view, wherein the two-dimensional view comprises, at least, material and surface property channels;
generate multi-view streams, wherein generating the multi-view streams comprises encoding the plurality of two-dimensional views;
encode parameters of the respective virtual camera view to a respective stream of the multi-view stream, wherein said parameters comprise one or more of the following: a pose, a resolution, a projection type, a field of view, a depth range;
receive a selection of one or more streams of the multi-view stream; and
stream the selected one or more streams.

8. The apparatus according to claim 7, wherein the plurality of two-dimensional views comprises a color view and a depth view.

9. The apparatus according to claim 7, wherein the selection is based on the parameters of the respective virtual camera view.

10. The apparatus according to claim 7, wherein the parameters are configured to indicate a relationship between the respective virtual camera view and the three-dimensional segment.

11. The apparatus according to claim 7, wherein the content is captured with multiple cameras.

12. The apparatus according to claim 7, wherein the content is a synthetic content.

13. A computer program product embodied on a non-transitory computer readable medium, comprising computer program code configured to, when executed on at least one processor, cause an apparatus or a system to:
generate a three-dimensional segment of a scene of a content, wherein the three-dimensional segment is a three-dimensional volumetric representation of the scene;
generate a plurality of two-dimensional views of the three-dimensional segment, wherein a two-dimensional view of the plurality of two-dimensional views is configured to represent a respective virtual camera view, wherein the two-dimensional view comprises, at least, material and surface property channels;
generate multi-view streams, wherein generating the multi-view streams comprises encoding the plurality of two-dimensional views;
encode parameters of the respective virtual camera view to a respective stream of the multi-view streams, wherein said parameters comprise one or more of the following: a pose, a resolution, a projection type, a field of view, a depth range;
receive a selection of one or more streams of the multi-view stream; and
stream the selected one or more streams.

14. The computer program product according to claim 13, wherein the two-dimensional view is a color and depth view.

15. The computer program product according to claim 13, wherein the selection is based on the parameters of the respective virtual camera view.

16. The computer program product according to claim 13, wherein the parameters are configured to indicate a relationship between the respective virtual camera view and the three-dimensional segment.

17. The computer program product according to claim 13, wherein the content is captured with multiple cameras.

18. The method according to claim 1, wherein the generating of the three-dimensional segment is based, at least partially, on at least one of: a projection parameter, or a depth range associated with the respective virtual camera view.

19. The method according to claim 1, wherein the scene comprises a scene generated based, at least partially, on depth information.

* * * * *